United States Patent [19]
Pedracine et al.

[11] Patent Number: 6,039,185
[45] Date of Patent: Mar. 21, 2000

[54] HEARING AID BATTERY INSERTER

[75] Inventors: Richard L. Pedracine, Madison, Wis.; Robert M. Michalsen, Des Plaines, Ill.

[73] Assignee: Rayovac Corporation, Madison, Wis.

[21] Appl. No.: 09/211,364

[22] Filed: Dec. 14, 1998

[51] Int. Cl.[7] .................................................. B65D 85/88
[52] U.S. Cl. .......................... 206/704; 206/469; 206/470
[58] Field of Search .................................. 81/6; 206/460, 206/469–471, 704; 294/903; 381/322–324; 429/99, 100

[56] References Cited

U.S. PATENT DOCUMENTS

| | | | |
|---|---|---|---|
| 3,433,351 | 3/1969 | Zaborney | 206/704 |
| 3,995,767 | 12/1976 | Brindley et al. | 206/704 |
| 4,015,708 | 4/1977 | Kelm . | |
| 4,209,091 | 6/1980 | Lieberman . | |
| 4,270,659 | 6/1981 | Kuchenbecker | 206/470 |
| 4,860,890 | 8/1989 | Cerny et al. . | |
| 4,953,700 | 9/1990 | DeDino . | |
| 5,033,616 | 7/1991 | Wyser . | |
| 5,117,977 | 6/1992 | Voroba . | |
| 5,199,565 | 4/1993 | Voroba . | |
| 5,203,455 | 4/1993 | Hewelt et al. . | |
| 5,299,687 | 4/1994 | Hanifl et al. . | |
| 5,839,583 | 11/1998 | Pope et al. | 206/704 |

OTHER PUBLICATIONS

Rayovac® Loud'n Clear® Hearing Aid Batteris—Exhibit A.

*Primary Examiner*—Jim Foster
*Attorney, Agent, or Firm*—Lathrop & Clark LLP

[57] ABSTRACT

A thin flexible sheet of PETG or similar plastic has a disk shaped body with a number of radially protruding petals. The outer perimeter of one side of the inserter is coated with a pressure sensitive adhesive. A hearing aid battery with its connected selectively-gas-permeable tab is adhered to each of the inserter petals. Each petal has a small through hole positioned in alignment with the vent hole on the battery, which permits exchange of gases through the semipermeable tab. A battery is inserted into a hearing aid while attached to the inserter by gripping the inserter between the thumb and forefinger, and positioning the battery into an adjacent hearing aid battery compartment and then separated from the inserter by a sliding or wiping motion. The inserter is retained in a container fixed by removable side strips to a backing card.

20 Claims, 2 Drawing Sheets

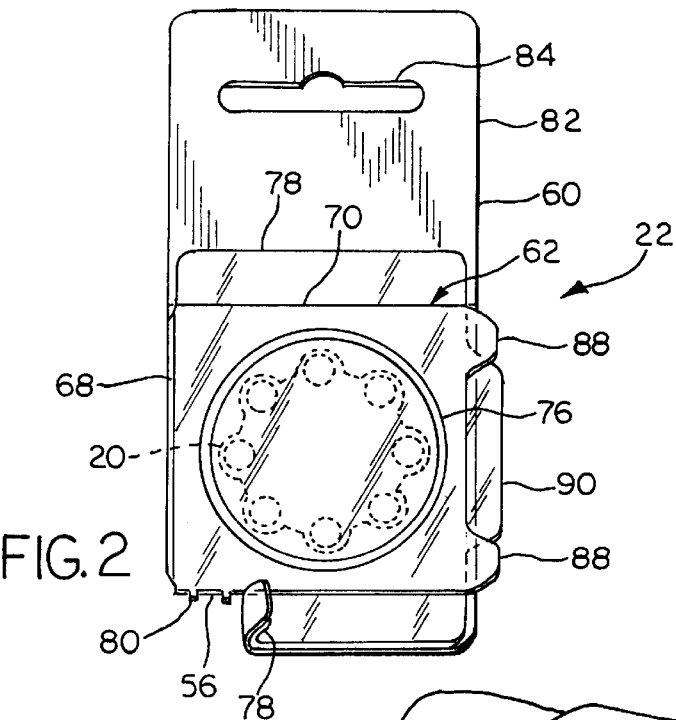
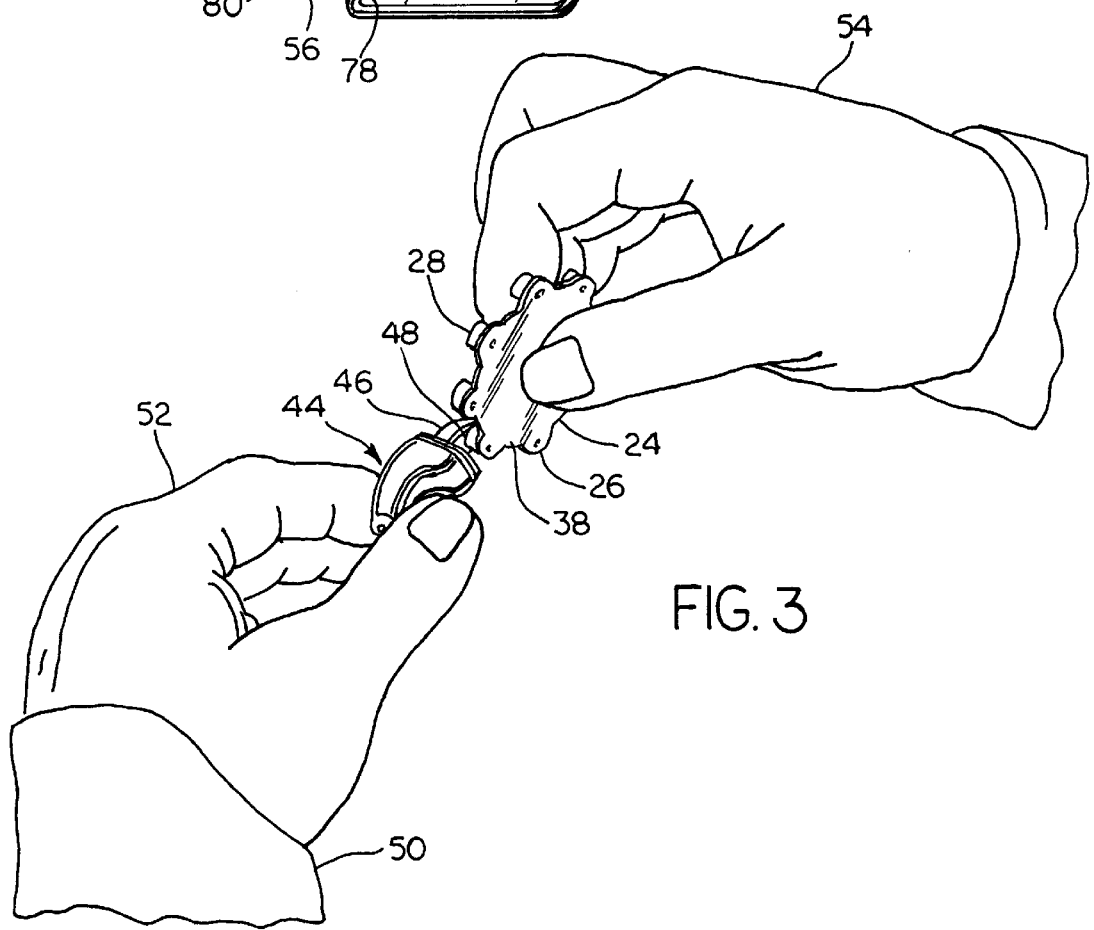

HEARING AID BATTERY INSERTER

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates to packaging for hearing aid batteries in general, and to devices for facilitating the insertion of batteries into a hearing aid in particular.

It is hard to exaggerate the importance of hearing and successful communication and interaction with the community. Those who suffer from hearing loss can easily become isolated, finding even common day-to-day activities greatly complicated. The invention of the electronic hearing aid, worn in or on the ear, has contributed greatly to improving the lives of hearing loss sufferers.

Improvements in electronic miniaturization have resulted in very small hearing aids which are capable of being unobtrusively worn within a user's ear. These small hearing aids are not only lighter weight and easier to wear, but they are cosmetically superior in that they do not detract from the wearer's appearance.

Yet, reduced hearing aid size comes at a cost: the batteries which supply power through the hearing aids must also decrease in size, and must be replaced at regular intervals. Anyone will have some difficulty in manipulating an object which has a diameter of less than half the width of a finger. For those who suffer from reduced dexterity, this difficulty will only be amplified.

A number of battery insertion devices have been developed to address this need. One approach is to package the batteries in a molded plastic dispenser which is capable of presenting each battery in a manner to protrude upwardly to be engaged in the battery door of a hearing aid. Not only are such devices costly to fabricate, but the increased thickness of the package consumes greater shelf space at the retail establishment, further contributing to cost. Another approach is to dispose the individual hearing aid batteries on flexible paper strips connected along perforations within a paper cover, similar to a matchbook. These folded, stapled, and die cut paper assemblies can be relatively costly, and may still be demanding of the user's manual dexterity.

What is needed is a hearing aid battery packaging assembly which is economical to produce, compact to display, and which facilitates easy insertion of the batteries into hearing aids.

SUMMARY OF THE INVENTION

The hearing aid battery inserter of this invention is formed of a thin flexible sheet of plastic material, such as PETG plastic. The inserter has a disk shaped body with a number of radially protruding petals. The outer perimeter of one side of the inserter is coated with a pressure sensitive adhesive. A hearing aid battery with its connected selectively gas permeable tab is adhered to each of the inserter petals. Each petal has a small through hole positioned in alignment with the vent hole on the battery, which permits exchange of gases through the semipermeable tab. A single battery may be conveniently inserted into a hearing aid while still attached to the inserter. By gripping the inserter between the thumb and forefinger, a single battery may readily be positioned adjacent the battery compartment of a hearing aid, inserted within the battery compartment, and then separated from the inserter by a sliding or wiping motion. The adhesive strength between the inserter pressure sensitive adhesive layer and the semipermeable tab, is preferably selected to be greater than the adhesive strength between the tab and the battery, such that the tab is retained on the inserter once the battery has been positioned within the hearing aid.

The battery inserter with attached batteries may be conveniently packaged in a tamper resistant thermoformed blister and card container. The thermoformed blister has a protruding lid which extends along an integral hinge from a recessed base. The base extends downwardly from a peripheral flange from which two side strips extend. The side strips are connected along perforations to the base flange, and are aligned with perforations in an overlying paper card. The side strips extend out beyond the width of the cover, and thereby prevent opening of the thermoformed blister while it is attached to the card. The card includes a hang hole for peg display of the container. After purchase, the card and blister are torn along the aligned perforations yielding a compact reclosable blister package which securely retains the inserter and fresh batteries therein.

It is an object of the present invention to provide a battery inserter for hearing aid batteries which assists the insertion of a small battery within a hearing aid.

It is another object of the present invention to provide a hearing aid battery inserter which is retained in a compact and re-usable package.

It is a further object of the present invention to provide a hearing aid battery inserter which retains a plurality of batteries while still permitting exchange of gases through the battery vent holes.

It is also an object of the present invention to provide a battery inserter which may be economically loaded with batteries on a conventional hearing aid battery assembly line.

Further objects, features and advantages of the invention will be apparent from the following detailed description when taken in conjunction with the accompanying drawings.

BRIEF DESCRIPTION OF THE DRAWINGS

FIG. 2 is a top plan view of the hearing aid battery inserter of FIG. 1 retained within the package of FIG. 1.

FIG. 3 is a perspective view of a battery supported on the hearing aid battery inserter of FIG. 1 being installed within a hearing aid.

DESCRIPTION OF THE PREFERRED EMBODIMENTS

Figure 1:
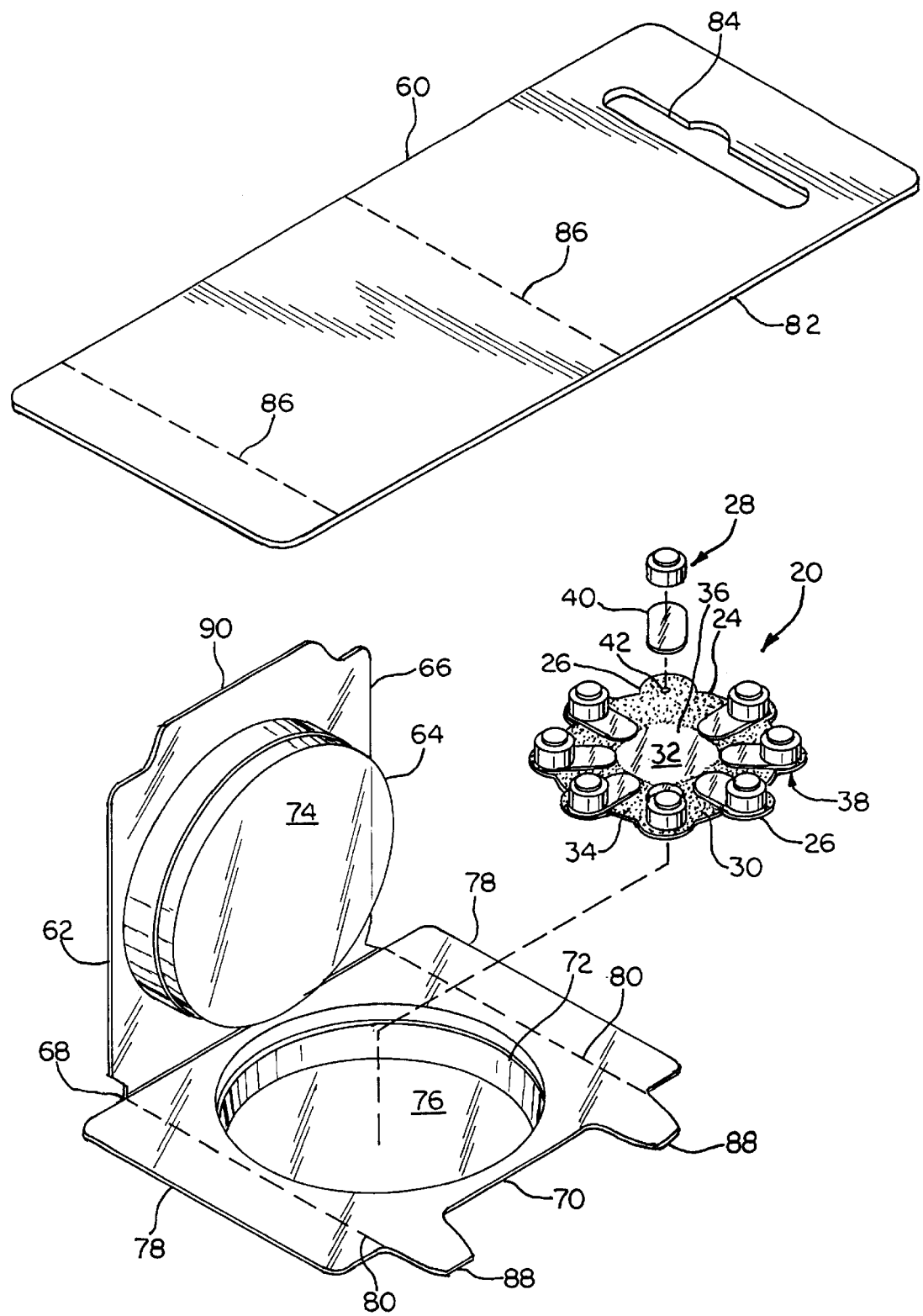
FIG. 1 is an exploded isometric view of the hearing aid battery inserter and package of this invention.

Referring more particularly to FIGS. 1–3, wherein like numbers refer to similar parts, a hearing aid battery inserter 20 is shown in FIG. 1. The battery inserter 20 is packaged for retail display within a blister card package 22, as shown in FIG. 2. The battery inserter 20 is preferably formed as a single die cut element from a sheet of PETG plastic. The inserter 20 may be formed on the equipment similar to that used for manufacturing self adhesive hang tabs for packages. The PETG plastic is cut to define a disk-shaped body 24 with radially extending petals 26. The body may be approximately $15/1000$ inches thick, and is hence somewhat flexible, yet still rigid enough to be supportive of the batteries. Each petal 26 is a semicircular extension from the body 24 which is preferably slightly greater in diameter than a hearing aid battery 28. An outer peripheral region 30 of the upper surface 32 of the inserter 20 is coated with a layer of pressure sensitive adhesive 34. The circular nonadhesive region 36 is defined within the outer peripheral region 30. The lower surface 38 of the inserter 20 is also free of adhesive.

Hearing aid batteries are commonly zinc air batteries. The batteries 28, being zinc air batteries, are typically produced in the battery assembly line and stored separately prior to packaging. In the conventional production of zinc air batteries a flexible selectively gas permeable tab 40 is connected to the positive terminal of the battery 28 by a pressure sensitive adhesive. The tab 40 covers the vent hole, not shown, in the positive terminal of the battery, and prevents oxygen from entering the battery. At the same time, the tab 40 is permeable to those gases which may be generated within the battery cell.

To prevent interference with this gas exchange function, the PETG inserter, which is not inherently permeable to these gases, is provided with a vent hole 42 die cut at the center of each petal 26. The inserter 20 may be manufactured on a die cutter having a vacuum attachment which removes the die cut circles to insure that none of the vent holes 42 are obstructed.

Hearing aid batteries 28 are manufactured in a variety of sizes, depending on the particular model of the hearing aids into which they will be inserted. One common 1.4 volt zinc air battery is approximately ¼ inch in diameter and about ⅛ inch tall. As commonly manufactured, the semipermeable plastic tabs are covered with a pressure sensitive adhesive over their entire surface, and then the portions of the tab which extend outwardly beyond the attached battery are "deadened" by the application of a nonadhesive covering layer. This covering layer is called for in a conventional battery insertion techniques to prevent the tab from remaining adhered to the user's fingers. In the present invention, the conventional tab with deadened layer may be employed if desired, however, deadening of the adhesive on the semipermeable tab 40 is not necessary, as the inserter 20 itself has a central region which is not adhesive for convenient grasping by the user. Furthermore, although the semipermeable tabs 40 have been illustrated as extending outwardly beyond the outer diameter of the attached hearing aid battery 28, this extension may be dispensed with if desired, as the extension is not required for the user to manipulate the battery.

Hearing aids come in a variety of shapes and sizes, yet they are similar in having a cylindrical or generally cylindrical depression or well which receives the cylindrical hearing aid battery 28. In one common model, the hearing aid 44, shown in FIG. 3, has a pivotable door 46 with a semicircular depression 48 which is extended from the body of the hearing aid and which receives the battery 28.

The inserter 20 has eight petals 26, each of which has a battery and semipermeable tab attached thereto. The batteries, being disposed around the perimeter of the inserter body 24, are relatively compactly positioned on the inserter. At the same time, however, the entire inserter is much wider than an individual battery, typically on the order of six times as wide as a battery. For example, an inserter 20 having eight batteries may have a measurement of approximately one inch between the centers of two batteries which are positioned on opposite sides of the inserter body. Thus, as shown in FIG. 3, a user 50 grasps the hearing aid in one hand 52, while grasping the inserter 20 and attached batteries 28 between the thumb and forefinger of the other hand 54.

The large diameter of the inserter body 24 makes manipulation and positioning of an individual battery 28 a comparatively simple matter. Furthermore, because the plastic of the inserter in the form of the individual petals 26 extends fully beneath each battery 28, and is adhesively connected to the batteries, the batteries are supported with respect to the inserter body and are controllably positioned by manipulation of the inserter body. The user 50 brings a battery 28 on a petal of the inserter 20 into engagement with the semicircular depression 48 on the battery door 46 of the hearing aid 44. To separate the battery from the inserter 20, the inserter is drawn away from the hearing aid 44 in a sliding or wiping motion to thereby overcome the adhesive connection between the tab 40 and the battery 28. The adhesive strength of the pressure sensitive adhesive 34 on the outer peripheral region 30 of the body 24 is preferably selected to be greater than the adhesive strength between the semipermeable tab 40 and the battery 28, such that the battery will separate from the tab before the tab separates from the inserter 20. In this way the battery is inserted and activated, by the removal of the tab 40, in a single step. The user may keep one finger positioned in proximity to the battery door to prevent the battery from escaping from the door once it has been separated from the inserter. Alternatively, the battery door may be closed partially while the battery is still on the inserter, and thus held partially within the hearing aid while the inserter is removed.

The frequency of battery replacements in a hearing aid depends on a number of factors: time of hearing aid activation, temperature, length of time since battery activation, etc. To be certain of continued hearing aid operation, the user will need to have replacement batteries on hand at all times. For this reason, a convenient traveling storage container 56 is of great utility. As shown in FIGS. 1 and 2, the storage container 56 is formed as a separable component of the display package 22, as shown in FIG. 2.

The package 22 is comprised of a die cut and perforated paperboard card 60 to which a transparent thermoformed thermoplastic blister is connected by any conventional means, such as adhesive, heat sealing, or ultrasonic sealing. The blister 62 has a lid 64 which protrudes from a lid flange 66. The lid flange 66 extends along an integral hinge 68 from a base flange 70. The integral hinge 68 may be formed in any conventional manner, including by scoring. A recessed base 72 extends downwardly from the base flange. The lid 64 and base 72 are preferably semi cylindrical and engage one with the other in a snap fit. When snapped together, the top wall 74 of the lid 64 is spaced from the floor 76 of the base 72 approximately the thickness of the inserter 20 with attached batteries 28.

Two removable side strips 78 extend from the base flange 70 along perforations 80, one strip on either side of the base 72. The paperboard card 60 has an upper portion 82 with a die cut hang hole 84 for mounting of the package on a protruding peg in a retail display. Two lines of perforations 86 are formed on the card 60 spaced the same distance from one another as the perforations are spaced on the blister base flange. The side strips 78 are affixed to the card 60 so that the base flange perforations align with the card perforations 86. Because the side strips 78 extend outwardly beyond the lid flange, this connection of the blister to the card effectively secures the container and the inserter with batteries to the card for retail display. It should be noted that the inserter with batteries has been illustrated in FIG. 1 as positioned in the package such that the batteries face toward the card 60. The orientation of the inserter within the package is not important, although in most situations it will be preferred to position the inserter such that the batteries project frontwardly for greater visibility to a potential purchaser.

As shown in FIG. 2, after purchase the container 56 is readily separated from the card 60 by tearing the strips 78 and the connected card from the container along the perforations 80, 86. Once separated from the card, the container 56 provides a protective enclosure for the batteries 28 on the inserter 20 and is conveniently reclosable over the life of the inserter. The base 72 may be provided with protruding tabs 88 on either side of a tab 90 on the lid 74 to facilitate opening of the closed container.

It should be noted that the inserter 20 is particularly well adapted to be filled with hearing aid batteries in an assembly line which is configured for conventional hearing aid battery packaging within cylindrical depressions spaced evenly from a common center. Because the inserter is also generally circular, conventional equipment may be used to dispose the batteries with attached semipermeable tabs in a circular array where the pressure sensitive adhesive coating on the inserter may be positioned to engage the tabs.

In an alternative embodiment, where batteries are manufactured and assembled onto the inserter in a single procedure, the semipermeable tabs may be formed and positioned on the inserter and the batteries than adhered to the tabs if desired.

It should be noted that the inserter need not be strictly circular, nor need the petals be fully semicircular. Oblong, polygonal, faceted, or other shapes with multiple positions for placement of batteries in such a fashion that the body does not interfere with insertion of the battery into a battery well or compartment, may be employed.

It should be noted that, although in a preferred embodiment the adhesive layer disposed on the inserter provides a means for releasably retaining the battery tabs to the inserter body, another means for retaining the battery tabs is some type of mechanical engagement, for example, a disk centered on the inserter body, and connected, for example by heat staking, at its center after positioning of the batteries and tabs on the petals.

It is understood that the invention is not limited to the particular construction and arrangement of parts herein illustrated and described, but embraces such modified forms thereof as come within the scope of the following claims.

We claim:

1. A device for inserting hearing aid batteries into a hearing aid, the device comprising:
    an inserter body having an outer periphery;
    a plurality of petals which extend radially outwardly from the inserter body, the petals positioned at the periphery of the inserter body;
    portions of each petal which define a through hole which extends through the petal to permit exchange of gases between a hearing aid battery positioned to overlie the petal; and
    a pressure sensitive adhesive layer on each petal to removably retain a hearing aid battery on the petal and inserter body, a hearing aid battery being so retained that it is positionable within the hearing aid on the petal while the inserter body is gripped by a user, the inserter body and petals being separable from the hearing aid battery once engaged within the hearing aid.

2. The device of claim 1 wherein the inserter body is generally circular, and wherein a first petal is spaced across the inserter body from a second petal.

3. The device of claim 1 wherein the inserter body is generally circular with an outer perimeter, and wherein the petals are arranged around the outer perimeter of the inserter body.

4. The device of claim 1 wherein the pressure sensitive adhesive layer extends in an annular region extending inwardly from the outer periphery of the inserter body, and wherein an adhesive-free region is defined radially inwardly from the annular region of adhesive, and wherein the inserter body has a lower surface which is adhesive free, the adhesive free region and the lower surface defining opposed areas for engagement by a user's fingers without adhesive attachment thereto.

5. The device of claim 1 wherein the inserter body and petals are formed of a die cut sheet of flexible plastic.

6. The device of claim 1 further comprising a plurality of zinc-air batteries, each battery being releasably connected to a selectively gas permeable tab by a pressure sensitive adhesive having a first release strength, the tabs being adhered to the pressure sensitive adhesive on the petals to retain the batteries to the inserter body, and wherein the release strength of the pressure sensitive adhesive layer on the petals is greater than the first release strength, such that a battery subjected to forces in a direction parallel to the surface of the petal will separate from the tab, before the tab separates from the petal.

7. The device of claim 1 further comprising a display package comprising:
    a backing card having portions defining two lines of perforation which are spaced apart a first distance; and
    a thermoformed thermoplastic blister having a lid which is hinged to a base, the lid being engaged with and positioned within the base, wherein a strip extends outwardly on either side of the base, the strips being positioned outwardly of two lines of perforation, the blister lines of perforation being spaced apart the first distance, wherein the strips are affixed to the backing card such that the card lines of perforation are aligned with the blister lines of perforation such that the card and attached blister may be torn along the aligned lines of perforation to separate portions of the blister from the card, and wherein the device of claim 1 is retained in the blister between the lid and the base.

8. A hearing aid battery inserter, comprising:
    a flexible plastic body having an outer periphery, wherein a plurality of plastic petals are integrally formed with the plastic body and extend outwardly from the plastic body around the outer periphery; and
    a pressure sensitive adhesive positioned on the plastic body and extending onto each petal to retain a hearing aid battery on the petal and body, a hearing aid battery being so retained that it is positionable within a hearing aid on the petal while the body is gripped by a user, the body and petals being separable from the hearing aid battery once engaged within the hearing aid, wherein portions of each petal define a through hole which extends through the petal to permit exchange of gases between a hearing aid battery positioned to overlie the petal.

9. A hearing aid battery inserter, comprising:
    a flexible plastic body having an outer periphery, wherein a plurality of plastic petals are integrally formed with the plastic body and extend outwardly from the plastic body around the outer periphery; and
    a pressure sensitive adhesive positioned on the plastic body and extending onto each petal to retain a hearing aid battery on the petal and body, a hearing aid battery being so retained that it is positionable within a hearing aid on the petal while the body is gripped by a user, the body and petals being separable from the hearing aid battery once engaged within the hearing aid, wherein the pressure sensitive adhesive layer extends in an annular region extending inwardly from the outer periphery of the body, and wherein an adhesive-free region is defined radially inwardly from the annular region of adhesive, and wherein the body has a lower surface which is adhesive free, the adhesive free region and the lower surface defining opposed areas for engagement by a user's fingers without adhesive attachment thereto.

10. A hearing aid battery inserter, comprising:

a flexible plastic body having an outer periphery, wherein a plurality of plastic petals are integrally formed with the plastic body and extend outwardly from the plastic body around the outer periphery; and a pressure sensitive adhesive positioned on the plastic body and extending onto each petal to retain a hearing aid battery on the petal and body, a hearing aid battery being so retained that it is positionable within a hearing aid on the petal while the body is gripped by a user, the body and petals being separable from the hearing aid battery once engaged within the hearing aid; and a plurality of zinc-air batteries, each battery being releasably connected to a selectively gas permeable tab by a pressure sensitive adhesive having a first release strength, the tabs being adhered to the pressure sensitive adhesive on the petals to retain the batteries to the body, and wherein the release strength of the pressure sensitive adhesive layer on the petals is greater than the first release strength, such that a battery subjected to forces in a direction parallel to the surface of the petal will separate from the tab, before the tab separates from the petal.

11. A hearing aid battery inserter, comprising:

a flexible plastic body having an outer periphery, wherein a plurality of plastic petals are integrally formed with the plastic body and extend outwardly from the plastic body around the outer periphery;

a pressure sensitive adhesive positioned on the plastic body and extending onto each petal to retain a hearing aid battery on the petal and body, a hearing aid battery being so retained that it is positionable within a hearing aid on the petal while the body is gripped by a user, the body and petals being separable from the hearing aid battery once engaged within the hearing aid and further comprising:

a display package comprising:

a backing card having portions defining two lines of perforation which are spaced apart a first distance; and a thermoformed thermoplastic blister having a lid which is hinged to a base, the lid being engaged with and positioned within the base, wherein a strip extends outwardly on either side of the base, the strips being positioned outwardly of two lines of perforation, the blister lines of perforation being spaced apart the first distance, wherein the strips are affixed to the backing card such that the card lines of perforation are aligned with the blister lines of perforation such that the card and attached blister may be torn along the aligned lines of perforation to separate portions of the blister from the card, and wherein the hearing aid battery inserter of claim 7 is retained in the blister between the lid and the base.

12. A hearing aid battery and inserter assembly comprising:

a plurality of hearing aid batteries, wherein each battery is adhesively connected to an underlying tab; and a plastic inserter having a central body with a plurality of peripheral battery attachment regions, wherein each battery and its underlying tab is adhesively attached to one of the battery attachment regions, and wherein portions of each battery attachment region define a through hole which extends through the inserter, said through holes being aligned with the overlying batteries to permit exchange of gases through the through holes and the batteries, the plastic inserter being capable of being gripped at a position intermediate between two attachment regions for controlled positioning of a battery on the inserter into the battery compartment of a hearing aid.

13. The assembly of claim 12 wherein the inserter body is generally circular, and wherein each battery attachment region has a generally semicircular perimeter, and wherein each battery is positioned with the generally semicircular perimeter of a battery attachment region.

14. The assembly of claim 12 wherein the batteries and the underlying tabs are adhesively attached to the inserter by a pressure sensitive adhesive layer which extends in an annular region extending inwardly from the battery attachment regions of the inserter, and wherein an adhesive-free region is defined radially inwardly from the annular region of adhesive, and wherein the inserter has a lower surface which is adhesive free, the adhesive free region and the lower surface defining opposed areas for engagement by a user's fingers without adhesive attachment thereto.

15. The assembly of claim 12 wherein the inserter is formed of a die cut sheet of plastic.

16. The assembly of claim 15 wherein the sheet of plastic is PETG plastic.

17. The assembly of claim 12 wherein each battery is releasably connected to a tab by a pressure sensitive adhesive having a first release strength, the tabs being adhered to a pressure sensitive adhesive on the battery attachment regions to retain the batteries to the inserter body, and wherein the release strength of the pressure sensitive adhesive layer on the insert is greater than the first release strength, such that a battery subjected to forces in a direction parallel to the surface of the petal will separate from the tab, before the tab separates from the battle.

18. The assembly of claim 12 further comprising a display package comprising:

a backing card having portions defining two lines of perforation which are spaced apart a first distance; and a thermoformed thermoplastic blister having a lid which is hinged to a base, the lid being engaged with and positioned within the base, wherein a strip extends outwardly on either side of the base, the strips being positioned outwardly of two lines of perforation, the blister lines of perforation being spaced apart the first distance, wherein the strips are affixed to the backing card such that the card lines of perforation are aligned with the blister lines of perforation such that the card and attached blister may be torn along the aligned lines of perforation to separate portions of the blister from the card, and wherein the assembly is retained in the blister between the lid and the base.

19. A hearing aid battery and inserter assembly comprising:

a plurality of hearing aid batteries, wherein each battery is adhesively connected to an underlying tab; and a plastic inserter having a central body with a plurality of peripheral battery attachment regions, wherein each battery and its underlying tab is connected to one of the battery attachment regions by a means for attaching the underlying tab to the inserter, the plastic inserter being capable of being gripped at a position intermediate between two attachment regions for controlled positioning of a battery on the inserter into the battery compartment of a hearing aid.

20. A display package for containing hearing aid batteries affixed to an inserter, comprising:

a backing card having portions defining two lines of perforation which are spaced apart a first distance; and a thermoformed thermoplastic blister comprising:

a lid which protrudes from a lid flange;

a base which is recessed from a base flange, wherein the base flange is hinged to the lid flange such that the lid is pivotable between a closed position in which the lid extends into the base, and an open condition in which the lid is spaced from the base;

a first side strip which is connected to the base flange along a first region of weakened material; a second side strip which is connected to the base flange along a second region of weakened material, the base being positioned between the first region of weakened material and the second region of weakened material, wherein the first side strip and the second side strip are affixed to the backing card such that the first region of weakened material and the second region of weakened material overlie the lines of perforation in the backing card, such that the card and attached blister may be torn along the aligned lines of perforation and first region of weakened material and second region of weakened material to separate portions of the blister from the card, the torn blister defining a transportable container for a hearing aid battery inserter and batteries.

* * * * *